US012632034B1

(12) United States Patent
Osterkamp et al.

(10) Patent No.: US 12,632,034 B1
(45) Date of Patent: May 19, 2026

(54) SYSTEMS AND METHODS FOR OPERATING A THREE-DIMENSIONAL PRINTER TO PRINT A PART FOR A PROPERTY

(71) Applicant: United Services Automobile Association (USAA), San Antonio, TX (US)

(72) Inventors: Bryan J. Osterkamp, New Braunfels, TX (US); Pooja Krishnaswamy, McKinney, TX (US); Nolan Serrao, Plano, TX (US); Kristina Suniga-Cabrera, San Antonio, TX (US); Carol Lyn Lawrence, Fair Oaks Ranch, TX (US); Breanna Nicole Allerkamp, Boerne, TX (US); Courtney Evans, Forney, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 347 days.

(21) Appl. No.: 18/203,471

(22) Filed: May 30, 2023

Related U.S. Application Data

(60) Provisional application No. 63/347,306, filed on May 31, 2022.

(51) Int. Cl.
*G05B 19/4099* (2006.01)

(52) U.S. Cl.
CPC ..................... *G05B 19/4099* (2013.01); *G05B 2219/49023* (2013.01)

(58) Field of Classification Search
CPC ...... G05B 19/4099; G05B 2219/49023; B29C 64/393; B29C 64/118; B29C 64/386; G06Q 10/20; G06Q 40/08; G06Q 10/06
See application file for complete search history.

(56) References Cited

U.S. PATENT DOCUMENTS

| | | | |
|---|---|---|---|
| 2014/0058959 A1* | 2/2014 | Isbjornssund | G06Q 50/184 705/310 |
| 2016/0198576 A1* | 7/2016 | Lewis | B29C 64/106 361/761 |
| 2016/0257074 A1* | 9/2016 | Levine | G05B 15/02 |
| 2018/0052446 A1* | 2/2018 | Carriere, IV | H04N 1/6058 |
| 2019/0032507 A1* | 1/2019 | Bewlay | G01M 15/14 |
| 2019/0143599 A1* | 5/2019 | Kothari | G06F 30/20 264/109 |
| 2020/0103857 A1* | 4/2020 | Wynne | G05B 19/4099 |

(Continued)

*Primary Examiner* — Alicia M. Choi
(74) *Attorney, Agent, or Firm* — Fletcher Yoder, P.C.

(57) ABSTRACT

A three-dimensional parts system includes a sensor configured to provide data indicative of conditions at or near a property associated with a consumer and a three-dimensional printer configured to print a part of the property. The three-dimensional parts system also includes one or more processors configured to monitor the data from the sensor; access a maintenance schedule for the property; determine an automatic request to print the part based on the data from the sensor, a recommended replacement time indicated by the maintenance schedule, or both; and in response to the automatic request, instruct the three-dimensional printer to print the part.

20 Claims, 3 Drawing Sheets

(56)          References Cited

U.S. PATENT DOCUMENTS

| | | | |
|---|---|---|---|
| 2021/0072725 A1* | 3/2021 | Rakshit | G05B 19/4099 |
| 2021/0241128 A1* | 8/2021 | Gusikhin | G05B 23/0283 |
| 2023/0047693 A1* | 2/2023 | Johansson | B29C 64/386 |
| 2024/0227309 A1* | 7/2024 | Clotet Marti | B33Y 40/00 |

* cited by examiner

SYSTEMS AND METHODS FOR OPERATING A THREE-DIMENSIONAL PRINTER TO PRINT A PART FOR A PROPERTY

CROSS-REFERENCE TO RELATED APPLICATION

The present application claims the benefit of and priority to U.S. Provisional Patent Application Ser. No. 63/347,306, titled "THREE-DIMENSIONAL PRINTING OPERA-TIONS SYSTEM AND METHOD," which was filed on May 31, 2022, and which is herein incorporated by reference in its entirety for all purposes.

BACKGROUND

The present disclosure relates generally to providing three-dimensional (3D) printed materials to consumers. More specifically, the present disclosure relates to efficiently generating and replacing parts using 3D printing.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, a consumer may own various properties. For example, the consumer may own a house, a car, a cellular device, an appliance, and so forth. Often, an entirety of a property or a portion of the property may be replaced overtime. In particular, the property may be associated with certain life expectancies, routine maintenance, or both. By way of example, a car may include various parts, and each of the parts may have different life expectancies and different maintenance schedules.

The consumer may repair each of the parts as they require replacing, for example, if the parts no longer provide an intended function. That is, the consumer may follow a manual process of checking if a particular part is functioning as expected and may discover that the particular part should be replaced (e.g., the particular part or the property with the particular part is no longer functioning as intended). The consumer may order the particular part after determining that the particular part should be replaced. However, this manual process of determining replacement needs and ordering parts may be inefficient and time consuming, and may often result in extended waiting periods for the parts to arrive.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a three-dimensional parts system includes a sensor configured to provide data indicative of conditions at or near a property associated with a consumer and a three-dimensional printer configured to print a part of the property. The three-dimensional parts system also includes one or more processors configured to monitor the data from the sensor; access a maintenance schedule for the property; determine an automatic request to print the part based on the data from the sensor, a recommended replacement time indicated by the maintenance schedule, or both; and in response to the automatic request, instruct the three-dimensional printer to print the part.

In one embodiment, a three-dimensional parts system includes a sensor configured to provide data indicative of current environmental conditions at a property associated with a consumer. The three-dimensional parts system also includes one or more processors configured to monitor the data from the sensor; access resources that indicate expected environmental conditions at the property; determine an automatic request to print a part based on the current environmental conditions at the property, the expected environmental conditions at the property, or both; and in response to the automatic request, instruct a three-dimensional printer to print the part.

In one embodiment, a method of operating a three-dimensional parts system includes receiving, at one or more processors and from one or more sensors, data indicative of an operational condition of an existing part at a property. The method also includes receiving, at the one or more processors and from one or more external resources, additional data indicative of expected environmental conditions at the property. The method further includes predicting, using the one or more processors, that a replacement part is likely to be needed at the property at a future time based on the operational condition of the existing part at the property and the expected environmental conditions at the property. The method further includes instructing, using the one or more processors, a three-dimensional printer to print the replacement part in advance of the future time in response to predicting that the replacement part is likely to be needed at the property at the future time.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
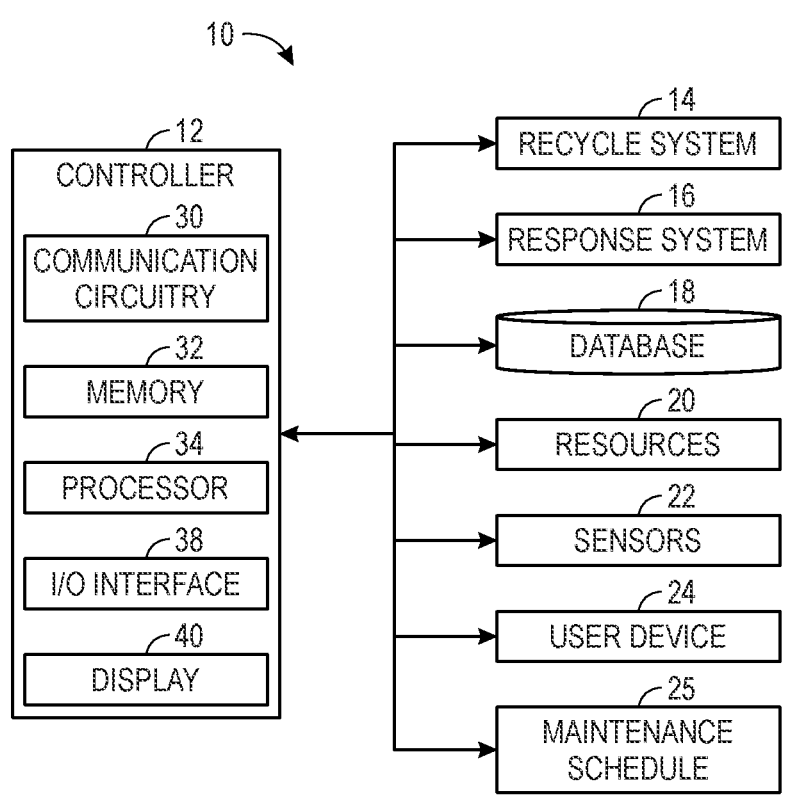
FIG. 1 is a block diagram of a three-dimensional parts system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As previously mentioned, a consumer (e.g., a user) may own property (e.g., associated with the consumer), such as appliances (e.g., washing machine, dryer, water heater), a home, an electronic device, a vehicle, jewelry, and the like. The property may be completely or partially replaced. That is, the property or portions of the property may include parts that may no longer be in condition to serve an intended purpose and thus, may be replaced. In some instances, the parts may be replaced due for preventive reasons, maintenance reasons, and the like. As used herein, the term "property" refers to tangible property that is capable of maintenance operations (e.g., repair and/or replacement).

By way of example, a vehicle (e.g., the property) associated with the consumer may include a headlight (e.g., a part of the property) that flickers or does not power on, and thus, does not operate as intended or expected. The headlight may often flicker after a certain time period has passed since the initial installment when the headlight was new. That is, the headlight may have a lifespan of the certain time period (e.g., 500 hours, 1000 hours, and so forth). As part of a process for maintaining the vehicle, the consumer may replace the part, such as by submitting a request to an insurance company that insures the vehicle to receive a replacement part for the headlight. After receiving the request, the insurance company may send the replacement part to the consumer if the replacement part is in stock. In some instances, for example, if the replacement part is no longer in stock, the insurance company may submit a request to a manufacturer of the replacement part to either directly provide the replacement part to the consumer, or indirectly by initially providing the replacement part to the insurance company to ultimately ship to the consumer. The replacement part may not be in stock for the manufacturer and thus, the manufacturer may spend time to manufacture the replacement part. In some instances, the consumer may reside in an area that is far from the insurance company, away from courier routes, or both, so that the consumer may not receive the replacement part for some time after the replacement part has been shipped. In any case, the process for the consumer to obtain and use the replacement part may be time consuming and inefficient (e.g., by waiting for the replacement part).

To efficiently maintain the property, such as by implementing preventive care and replacing parts, the consumer, the insurance company, or both, may utilize a three-dimensional (3D) printing parts system for providing the replacement part. In particular, the 3D parts system may include monitoring one or more factors associated with the property, such as a maintenance schedule and/or a preventive care schedule associated with the property, maintenance and/or preventive care steps completed at the property, sensor data from one or more sensors disposed at the property, present environmental conditions near and/or at a particular location or area (e.g., within a threshold distance from the property), expected environmental conditions that may cause the consumer to likely replace the part, and so forth. Efficiently providing the replacement part may include an automatic workflow based on the one or more factors, such as automatically 3D printing the replacement part based on the one or more factors.

In some embodiments, the 3D parts system may also print at least one of the one or more sensors that are disposed at or on the property to detect and provide the sensor data. The printed sensor(s) may be part of or disposed on printed parts. The sensor data may indicate a current function of the part, a comparison to the intended function of the part, or both. Generally, the 3D parts system may facilitate monitoring the part (e.g., a maintenance schedule), provide a recommendation to review or replace the part, monitor environmental conditions associated with the part, automatically print the replacement part and/or the sensor(s) for detecting the sensor data for the replacement part (and/or for the part), recycle and reuse printing material of the part, and the like.

It should be noted that although examples provided herein may be specifically directed to replacement parts for certain types of insured property, the techniques in this disclosure may be applied to other conditions and/or contexts, such as any context for providing objects (e.g., medical field, real estate field, and so forth). Thus, the present examples should be understood to reflect real-world examples of the replacement parts for insured property to provide useful context for the discussion, and should not be viewed as limiting further applicability of the present approach. For example, the present disclosure should be understood as being applicable to additional situations in which 3D printing may be utilized, such as for creating housing, prototypes, toys, medical tools and devices, prosthetics, and so forth. Further, it should be appreciated that the 3D printing process (e.g., monitoring, determining replacement is needed, printing, installing, recycling) may be cyclical and repeated over time so that steps described herein as being carried out for the part (e.g., existing or initial part) may be later carried out for the replacement part that was used to replace the part (e.g., for eventual replacement of the replacement part), and similarly, steps described as being carried out for the replacement part may be earlier carried out for the part (e.g., the existing or initial part; to print the part). Accordingly, terms such as "part," "replacement part," "printed part" and so forth may be used herein to refer to any parts that are part of the 3D printing process.

With the preceding in mind, FIG. 1 is a block diagram of a 3D parts system 10 (e.g., parts system). As shown, the 3D parts system 10 includes a controller 12, which may communicate with (e.g., transmit data to and/or receive data from) a recycle system 14, a response system 16, one or more databases 18, one or more resources 20, one or more sensors 22, one or more user devices 24 associated with the consumer (e.g., user), and/or one or more maintenance schedules 25. It should be understood that the illustrated 3D parts system 10 is merely intended to be exemplary, and that certain features and components may be omitted and various other features and components may be added to facilitate performance, in accordance with the disclosed embodiments.

The controller 12 may include a communication circuitry 30, a memory 32, a processor 34, an input/output interface 38 (I/O interface), and a display 40. The controller 12 may enable the communication circuitry 30 to interface with various electronic devices, such as the recycle system 14 (e.g., including respective one or more processors 34, memories 32, and/or other system devices), the response system 16 (e.g., including respective one or more processors 34, memories 32, and/or other system devices), the database 18, the resources 20, the sensors 22, the user device 24 associated with the consumer, and the maintenance schedule 25 (collectively referred to as "components"). In some embodiments, the sensors 22 may be 3D printed and communicate with and/or be controlled based on the maintenance schedule 25 to monitor maintenance issues, for example, based on an expected maintenance associated with the property (e.g., recommended replacement times).

The communication circuitry 30 may allow the controller 12 to communicatively couple to a network, such as a personal area network (PAN), a local area network (LAN), and/or a wide area network (WAN). Accordingly, in some embodiments, the controller 12 may process data from the components to make parts-related determinations, such as to determine maintenance of a part associated with a property; determine whether conditions trigger an automated request for a replacement part based on the data from the resources 20, the sensors 22, and/or the maintenance schedule 25; determine that the part may be replaced by 3D printing the replacement part based on available materials that may be in the recycle system 14, and so forth. Similarly, the controller 12 may communicate data to the components via the communication circuitry 30, such as to communicate a print status of a requested replacement part to the user device 24. For example, after processing data from a device (e.g., a server, a database, a memory, and so forth) associated with the maintenance schedule 25, the processor 34 may determine and transmit a wireless control signal to the response system 16 via the communication circuitry 30 to 3D print the replacement part. By way of example, the processor 34 may also determine and transmit a wireless message to an installer (e.g., person to install the part at the property) to pick up the replacement part after printing when the replacement part is printed at a printer not associated with the consumer. In other embodiments, the communication circuitry 30 may be connected via a wired connection to the components.

The processor 34 may include one or more processing devices that receive input signals from the I/O interface 38, such as signals relating to the environmental conditions at or near the property and/or the maintenance schedule 25 that may cause an automated request to replace the part, consumer approval of the automated request to print the replacement part, signals indicating a request received from the consumer for the replacement part (e.g., a request received from the user device 24), and so forth. This information may be subsequently used to produce the replacement part via 3D printing, using techniques described herein.

The memory 32 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired algorithms (e.g., program code) in the form of machine-executable instructions or data structures and which can be accessed by the processor 34 or by other processor-based devices. In particular, the processor 34 may include a processing core to execute machine-executable instruction algorithms stored in the memory 32. The processor 34 may also include processor-side interfaces for software applications running on the processing core to interact with hardware components, software components, or both, of the 3D parts system 10. The memory 32 may store algorithms for processing data indicating a manual (e.g., via consumer approval) or automatic request for printing the replacement part, severity of repair of the part to be replaced to utilize self-repair printing or expert-repair printing, and so forth. The memory 32 may also store algorithms indicating the threshold causing the automated request for the 3D printed part (e.g., threshold related to weather related conditions for a particular part in a particular area, threshold related to time period for replacement part expected to need replacement, and the like).

In general, the I/O interface 38 may include interfaces that facilitate communication with the components (e.g., the recycle system 14, the response system 16, the database 18, the resources 20, the sensors 22, the user device 24, and the maintenance schedule 25) and other devices. In some embodiments, the I/O interfaces 38 may couple to other peripheral components such as input devices (e.g., keyboard, mouse), sensors, input/output modules (I/O), and the like. The display 40 may operate to depict visualizations associated with software or executable code being processed by the processor 34. In one embodiment, the display 40 may be a touch display capable of receiving inputs from a user of the controller 12, such as an input to request the part. The display 40 may be any suitable type of display, such as a liquid crystal display (LCD), plasma display, or an organic light emitting diode (OLED) display, for example. Additionally, in one embodiment, the display 40 may be provided in conjunction with a touch-sensitive mechanism (e.g., a touch screen) that may function as part of a control interface for the controller 12. The controller 12 may be a distributed computing system with multiple processors 34 and other components distributed at various locations (e.g., cloud computing system, servers, displays).

The recycle system 14 may include one or more devices, one or more processors 34, and one or more memories 32 for recycling a 3D printed part. Generally, a printed part may be recycled and reused for additional printing of another part, a sensor, and the like. By way of example, a 3D printed protective cover for a roof during a hail storm may be recycled for printing materials and reused to produce a maintenance or replacement part, such as a shingle for the roof. The 3D printing may be used for household items as well, such as items that are often replenished. By way of example, paper may be recycled and toilet paper for the consumer may be 3D printed using recycled paper. As such, the recycle system 14 may utilize 3D printing materials, recycled paper, and the like (e.g., glass, clay, metal, and so forth).

In some embodiments, the part may be unused due to a misprint, an unintentional print (e.g., wrong part or multiple copies of the part), a damaged part (e.g., due to improper handling), and/or the printed part may not meet an intended function threshold. For example, the part may provide a particular function. However, the printed part may not provide the intended function within a predetermined threshold as determined by the insurance company, the consumer, or both. In some embodiments, the threshold may be based on a quality level that provides the intended function of the part. A consumer may recycle the 3D printed part by mailing or dropping off the part to a recycling facility or another location designated for 3D print recycling, as designated by the insurance company. By the consumer providing the unused part to the recycling system, other 3D printed parts may be efficiently printed since the printing materials may become readily available based on such provision. That is, the time associated with supplying the printing materials to the 3D printer may be avoided. Moreover, recycling the unused part may substantially decrease fulfillment time for delivering the 3D printed part in a remote area, which may be difficult to reach and have long delivery times (e.g., more than 7 days) for delivering the printed materials. In some embodiments, a sensor, a part, or both may be recycled due to a need for another part having a relatively higher priority than existing printed parts. For example, another part may have a high priority based on incoming weather, and thus, unused printed part or parts having lower priority may be recycled.

In some embodiments, the consumer may receive a discount toward 3D printed parts requested in the future when the consumer 3D prints, recycles the 3D part for printing another part, or both. Additionally or alternatively, the consumer may receive a discount toward an insurance payment or premium, a cash back bonus, and so forth.

The response system 16 may include one or more devices, one or more processors 34, and one or more memories 32 that fulfill a request for the requested replacement part. By way of example, the response system 16 may fulfill a request from the controller 12, provide feedback associated with the fulfillment, send control signals or requests to a 3D printer to fulfill the request, and the like. The response system 16 may include one or more 3D printers associated with the consumer and/or specialists, one or more installers, and one or more vehicles for delivering the part, and so forth.

For example, the response system 16 may include distribution requirement planning (DRP), which includes the process for efficiently supplying particular replacement parts from particular distribution sites (e.g., closest to the consumer). This process may involve using vehicles, like human-operated or autonomous mobile vans and/or unmanned aerial vehicles (e.g., drones), to deliver the printed parts from the distribution sites. In some embodiments, the vehicles may include the 3D printers so that the part may be efficiently delivered without delay otherwise associated with retrieving the printed part from the 3D printer for subsequent delivery. In some embodiments, the response system 16 may be distributed across various geographical areas. For example, the distribution may be based on proximity to the present and potential consumers, the printing materials, the 3D printers, and so forth.

In some embodiments, using the DRP may be based on instructions from an algorithm performed by the processor(s) 34 based on code in the memory 32 that accounts for severity of the repair for the part. For example, the consumer may be instructed (e.g., via a recommendation presented on the user device 24) to carry out out a process and/or to supervise an automated process to 3D print the replacement part (e.g., self-repair printing) when the severity of the repair is below a repair threshold, while a specialist in the DRP process may be instructed to carry out a process and/or to supervise an automated process to 3D print the replacement part (e.g., expert-repair printing) when the severity is above the repair threshold. In some instances, the repair threshold may include different levels, such as a first repair threshold, a second repair threshold, a third repair threshold, and so forth, each having resulting a different authorized processes and/or authorized personnel for printing. For example, the consumer may 3D print the replacement part when the severity is below the first threshold (e.g., low severity of repair), a local expert or specialist in the area (e.g., within a predetermined distance from the consumer) may 3D print the replacement part when the severity is below the second threshold and above the first threshold (e.g., medium severity of repair; consumer blocked from printing), and a DRP authorized specialist, an original equipment manufacturer (OEM), and the like, when the when the severity is within the third threshold and above the second threshold (e.g., high severity of repair; consumer and the local expert blocked from printing).

The response system 16 may utilize telematics for monitoring the 3D printers, vehicles, specialists, and so forth, for monitoring repairs performed, who made the repairs, as well if the consumer is following insurance protocols as outlined by the insurance company. For example, the insurance protocols may advise the consumer to replace the replacement part using authorized means of repair based on the severity of the repair. Specifically, the response system 16 may store data (e.g., in a database and/or in a table format in the databases 18) identifying the 3D printers and/or the vehicles (e.g., unique identifier (IDs) for the 3D printers, the vehicles, or both) used for the printing, authorized personal IDs, consumer ID information (e.g., name, address, insured parts, etc.), and so forth. By way of example, the 3D parts system 10 may track status of the replacement part using the unique ID of the 3D printer, the vehicle delivering the part, or both.

The databases 18 may include one or more storage devices for storing data related to parts, such as insured property associated with the consumer, lifespan of insured party or insured property (e.g., including parts). The databases 18 may update in real time and may also include historical data related to environmental conditions for the printing areas, as well as historical data related to the parts (e.g., track a type of part often requested or replaced, maintenance schedule of the parts, lifespan of the parts). Data related to consumers, associated properties, and insurance data for the consumer (e.g., insured parts, personal information, recently replaced parts, and so forth), may also be stored in the databases 18.

The processor 34 may utilize a predictive algorithm and predictive information when requesting parts for 3D printing. By way of example, and as discussed with respect to FIG. 3, the processor 34 may use the information to determine a present need or to predict a future need of the part to be 3D printed. The processor 34 may automatically submit a request for printing the part (e.g., at the printer associated with or owned by the consumer) in response to an indication that a weather condition is not within an acceptable threshold (e.g., stored in the database 18) and based on the property insured by the consumer. That is, the processor 34 may preemptively submit a request for the part based on the historical data and/or data from the sensors 22. For example, if the consumer owns a home in an area that typically experiences flooding during a particular month, the processor 34 may submit a request for the part to prevent flooding in the home in the particular month. In some embodiments, the processor 34 may also automatically submit a request for printing the part based on maintenance schedules associated with the part that may indicate the part will likely (e.g., above a threshold) need replacement based on the schedule. The threshold may be based on a number of requests historically received for the part within a particular time frame (e.g., a day, a week, a month, and so forth), lifespan of parts, prior replacements (e.g., timing), prior cleaning or maintenance steps, and so forth. Moreover, the response system 16 may include sensors, which may be 3D printed and may be used for monitoring the parts. In some instances, the 3D printed sensors may communicate with the 3D printed parts (e.g., directly coupled or communicatively coupled). By way of example, the response system 16 may print a 3D printed hose, as well as print a monitoring clip that is coupled to and/or integrally formed with the 3D printed hose so as to be used as a sensor for monitoring the 3D printed hose (e.g., leaks, strain).

The resources 20 may include one or more data sources external to the controller 12 and the 3D printers. For example, the resources 20 may include electronic news sources, social media sources, any applications associated with the user device 24 (e.g., installed or used by the user device 24) such as global positioning system (GPS), and the like. The new sources may include various news services that may be updated in real time or near real time via a network, and they may provide information regarding weather alerts, natural disaster alerts, unnatural disaster alerts (e.g., traffic, active shooter), and any other information that may be published via an electronic news outlet such as a webpage, news database, or the like.

The social media sources may include social media sites such as Facebook®, Twitter®, and the like. In some embodiments, the social media may be associated with the consumer and/or the user device 24. For example, data from social media associated with the location of a user or a destination of the user may be provided to the controller 12. The social media may also include data trending on social media sites that may not be directly associated with the individual, but that may provide information regarding environmental conditions, such as the natural disaster, the dangerous situation, and the like. The processor 34 may determine (e.g., predictively determine) that a replacement part or a new part may likely be requested based on the data from the resources 20, and thus, may automatically submit a request for printing the part rather than waiting for the consumer to submit the request.

In some embodiments, the controller 12 may include machine learning that may learn, via various data sets, the likelihood of a part to be requested and thus, may automatically submit the request. In some embodiments, 3D printing material may be supplied to areas experiencing environmental conditions below an acceptable threshold, such as areas experiencing natural disasters (e.g., high winds, rainfall, snow, flooding) that may damage insured property. For example, the processor 34 may monitor data from the resources 20 to proactively start printing 3D printed parts for areas experiencing the environmental conditions below the acceptable threshold (e.g., request printing of shingles for roof in response to receiving data indicating a tornado) for the area with the insured property. Further, the processor 34 may start printing the 3D printed parts that are appropriate for the property and other properties within the areas, such as based on predicted needs for parts as determined according to the sensor data from the sensors 22, the maintenance schedules 25, and/or other data in the database 18 (e.g., construction data, such as structural features and/or materials, for the property and the other properties in the areas). In some embodiments, the 3D printed parts may be recycled and reused. For example, the printed parts may be melted after the environmental conditions are within the acceptable threshold (e.g., threat of natural disaster no longer exists and no predictions of another natural disaster). The melted printing materials may be used to print other parts, such as parts for maintaining the property and preventive parts to prevent potential damage to the property associated with the consumer.

The sensors 22 may include devices capable of detecting location, moisture, temperature, light, physical damage, and the like. In some embodiments, the sensors 22 may be 3D printed and used to collected data for parts, which may also be 3D printed. One or more of the sensors 22 may be disposed on or near the insured property (e.g., within a threshold distance from the property and/or the area), such that the sensors 22 may provide accurate information related to the condition of the property. By way of example, in an insured home, the sensors 22 may be disposed within certain rooms of the home, outside the home (e.g., the roof or the windows), and so forth. The sensors 22 may also be included in devices associated with the consumer, such as the user device 24 that is carried by or worn by an individual. For example, the sensors 22 may be disposed on mobile phones, wearable electronics, and the like. In one embodiment, the sensors 22 may provide location information of the sensors 22. As such, the sensors 22 may provide global positioning system (GPS) coordinates and the like to indicate a location of the sensors 22. In some embodiments, the sensors 22 may include counting or tracking devices to track a number of parts. For example, the sensors 22 may be located at areas associated with the recycle system 14 (e.g., recycling location) to track 3D parts that are recycled for printing materials and/or the response system 16 (e.g., within response vehicles, on the 3D printers, and so forth).

In some embodiments, the sensors 22 may be printed and placed inside a printed part, coupled to (e.g., directly or communicatively) the printed part, and the like. This may enable the sensor 22 to detect changes in the printed part (e.g., wear, damage, and forth). By way of example, the sensor 22 may be placed inside a printed device to detect water, and the sensor 22 may determine whether water is leaking through the printed device. Moreover, printing the sensor 22 may facilitate unique or custom dimensions for the sensor 22 and/or shaping the sensor 22 to fit particular spaces (e.g., property-specific dimension). For example, monitoring the water leak may be associated with a particular, non-traditional height and as such, the sensor 22 may be custom printed to be placed accordingly for the height and to fit in the particular area being monitored for the water leak. In some embodiments, the sensor 22, the parts, or both, may include circuitry. The circuitry may also be printed by the 3D parts system 10. That is, an entire system may be 3D printed (e.g., entire device). In some instances, the circuitry may be configurable to be powered using various energy sources. For example, the circuitry may be powered using a battery, solar energy, and/or wireless charging. Parts that are power the circuitry or device, such as a battery, may also be 3D printed.

Figure 2:
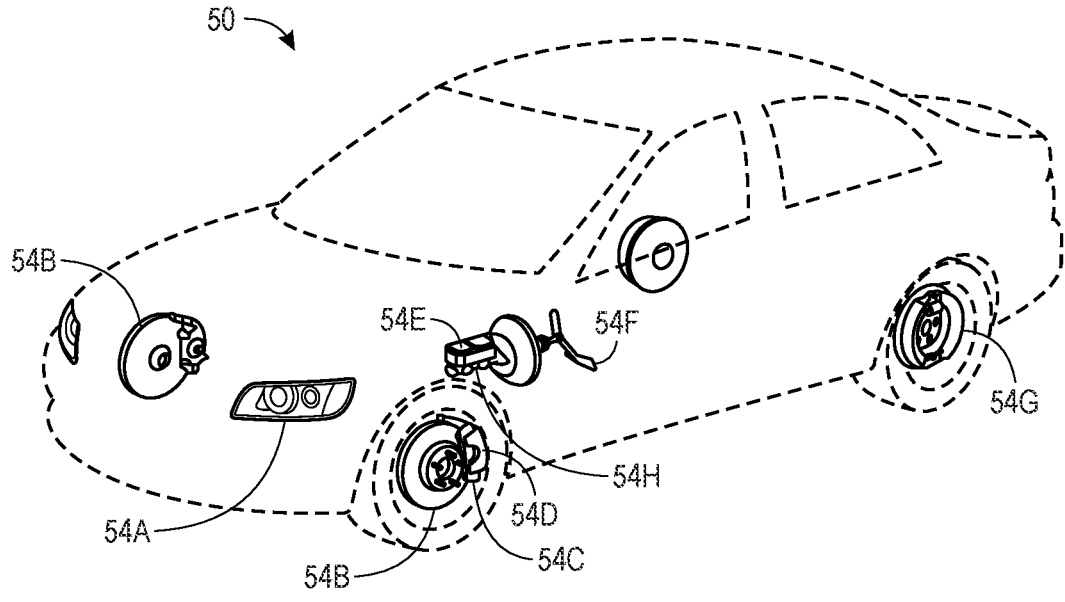
FIG. 2 illustrates an example of a device associated with the three-dimensional parts system of FIG. 1, in accordance with embodiments described herein.

FIG. 2 illustrates an example of a device associated with the 3D parts system 10 of FIG. 1. Although the current embodiment depicts a vehicle 50, which represents a particular embodiment, the device may be any property associated with the consumer, for example, that may benefit from efficiently replacing parts, such as for maintenance and/or preventive purposes. As shown, the vehicle 50 includes multiple parts 54 that may be replaced or supplemented based on monitored maintenance, scheduled maintenance, and/or for general preventive care (e.g., replace everyday tires with 3D printed snow tires for upcoming winter season to prevent damage to less suitable tires currently installed). Here, the parts 54 include one or more headlights 54A, brake rotors 54B, brake pads 54C, brake calipers 54D, brake fluid reservoirs 54E, brake pedals 54F, brake shoes 54G, and a master cylinder 54H. The vehicle 50 may include other parts that may also be printed using the 3D parts system 10, such as tires, air filters, oil filters, belts, caps, fasteners, parts related to performing an oil change, parts related to replacing a flat tire, seats, steering wheel, speakers, floor mats, and so forth. In some embodiments, the printed parts may be recycled for printing materials, so that the material may be used for additional printing.

The parts 54 may be generally monitored via one or more of sensors 22, a maintenance schedule, a history of parts replaced (e.g., location of replacement, whether it was 3D printed, lifespan of the part versus expected lifespan of the part, and so forth). The sensors 22 may collect data that indicates the current condition of the parts 54. The maintenance schedule 25 for the parts 54 may be based on a part type, a part version, the vehicle 50 (e.g., type and/or version), and so forth. In general, the 3D parts system 10 may print the parts 54 to maintain the vehicle 50 in a condition that is above a quality threshold. In some embodiments, the 3D parts system 10 may print the parts 54 to replace damaged parts 54 or to prevent damage to the parts 54, for example, before a routine maintenance. In some embodiments, additional data may be considered for printing parts using the 3D parts system 10.

Figure 3:
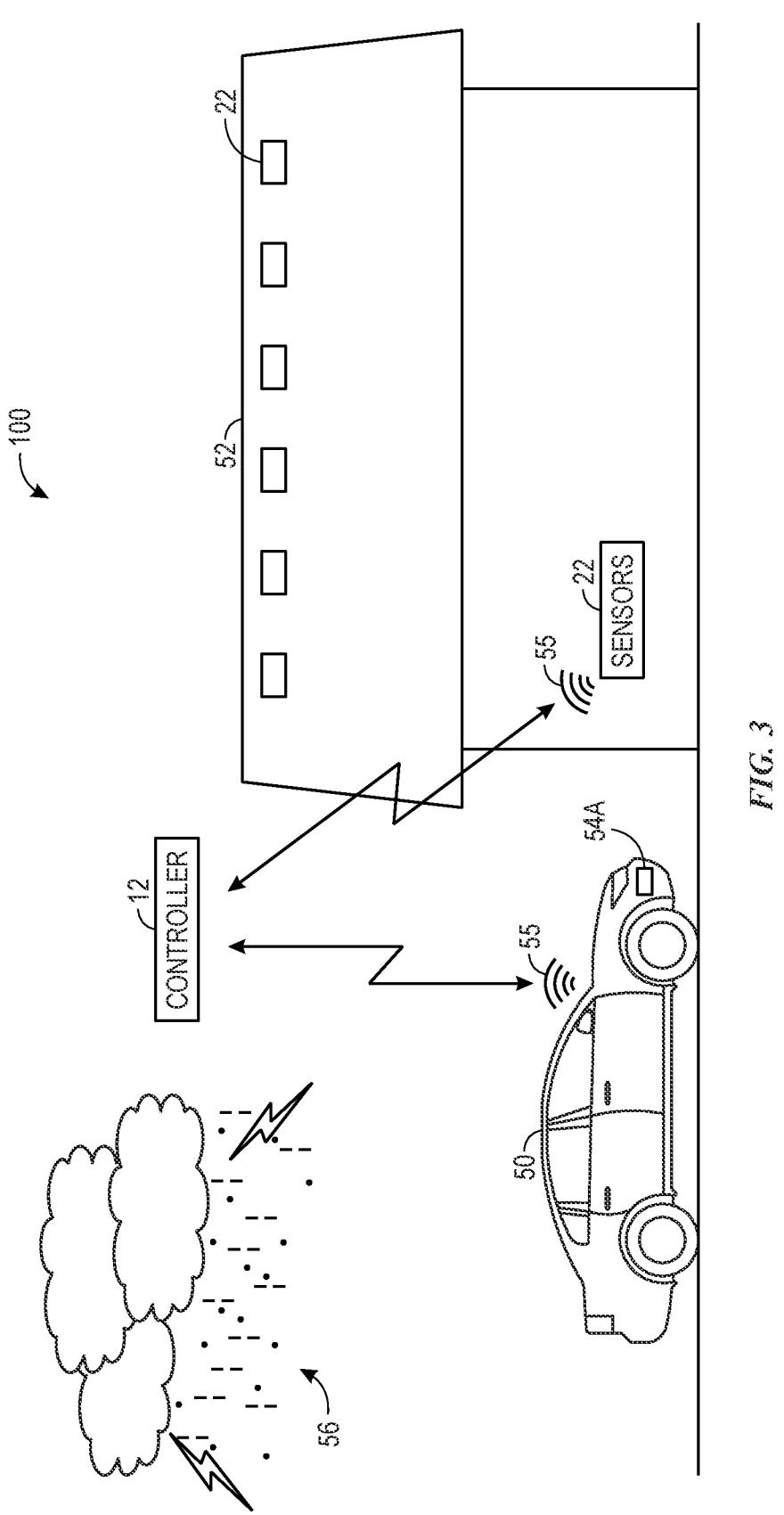
FIG. 3 illustrates an example of the three-dimensional parts system of FIG. 1 receiving data that initiates a request for printed replacement parts, in accordance with embodiments described herein.

To illustrate, FIG. 3 depicts an example 100 of the 3D parts system 10 receiving data that triggers a request for printed replacement parts (e.g., to replace parts that are damaged or for preventive measures). That is, and as previously discussed, the processor 34 of the controller 12 may automatically submit a request for printing a part (e.g., based on certain conditions, predictions, and sensor data) or after receiving a request from the consumer. For example, the data triggering a request for printing may be based on parts that are monitored via the sensors 22 for maintenance issues, as well based on the maintenance schedule 25 associated with the parts for preventive care. The request may automatically cause printing or request approval from the consumer for the printing (e.g., an additional request for consumer approval). In some embodiments, the sensors 22 may be printed, as well as recycled for printing material after a need for the sensors 22 no longer exists, if printing materials to print other parts is higher priority, or both. In some embodiments, the sensors 22 may include one or more sensors of one or more types based on the property monitored using the sensors 22.

In the depicted example, the processor 34 may receive data related to one or more properties associated with the consumer, such as the vehicle 50, a house 52, or both (e.g., owned by and/or insured by the consumer). Here, the properties include the sensors 22 that are located on the properties, such as on or near the headlight 54A of the vehicle 50, on the roof of the house 52, and on the exterior of the house 52. In some embodiments, the sensors 22 may be within a threshold distance from the properties, in which the threshold distance is based on a distance that may enable the sensors 22 to provide accurate data to the processor 34.

In this example, weather conditions 56 indicate weather conditions above or below an acceptable weather conditions threshold for parts of the vehicle 50, the house 52, or both. By way of example, the weather conditions 56 may indicate a storm, hailing, excessive heat, excessive cold, or local lightning, which may likely (e.g., above a likelihood threshold) cause damage to the parts. In some embodiments, the sensors 22 may include sensors that detect heat, precipitation, humidity, condensation, snow, presence of an object (e.g., hail), and other weather-related conditions. In additional or alternative embodiments, the sensors 22 may detect weather-related conditions (e.g., moisture) above or over the threshold.

Here, some sensors 22 are placed on roof shingles of the house 52. These sensors 22 may be 3D printed. Specifically, these sensors 22 may be printed and placed based on data (e.g., from the resources 20) indicating unexpected or extreme weather conditions that may cause damage to parts and/or property. As previously discussed, when the sensors 22 are no longer necessary, such as when the weather conditions are back to an expected condition, the sensors 22 may be recycled (e.g., melted) for printing material to use for printing other parts. The unexpected weather conditions detected by the sensors 22 may trigger automatic requests for replacement shingles (e.g., parts). Data from the sensors 22 may also indicate a change in temperature, pressure, humidity, and the like, that may affirm or indicate that the weather conditions 56 are below or above the threshold. In particular, the controller 12 (e.g., the processor 34 of the controller 12) may receive the data from the sensors 22 via the communication circuitry 30 that is communicated over a network 55.

Figure 4:
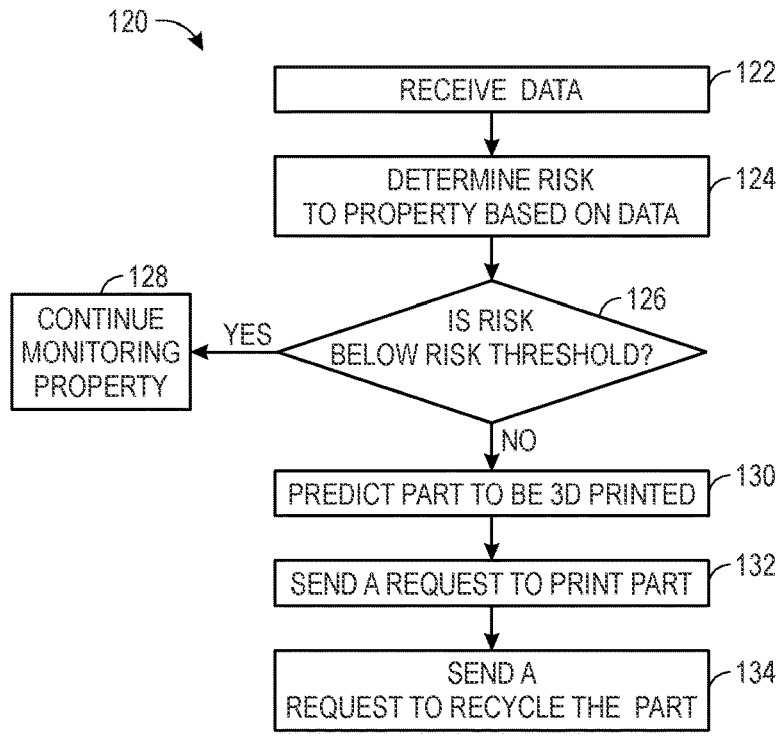
FIG. 4 is a flow diagram of a method for predicting a need for printed parts, in accordance with embodiments described herein.
Figure 5:
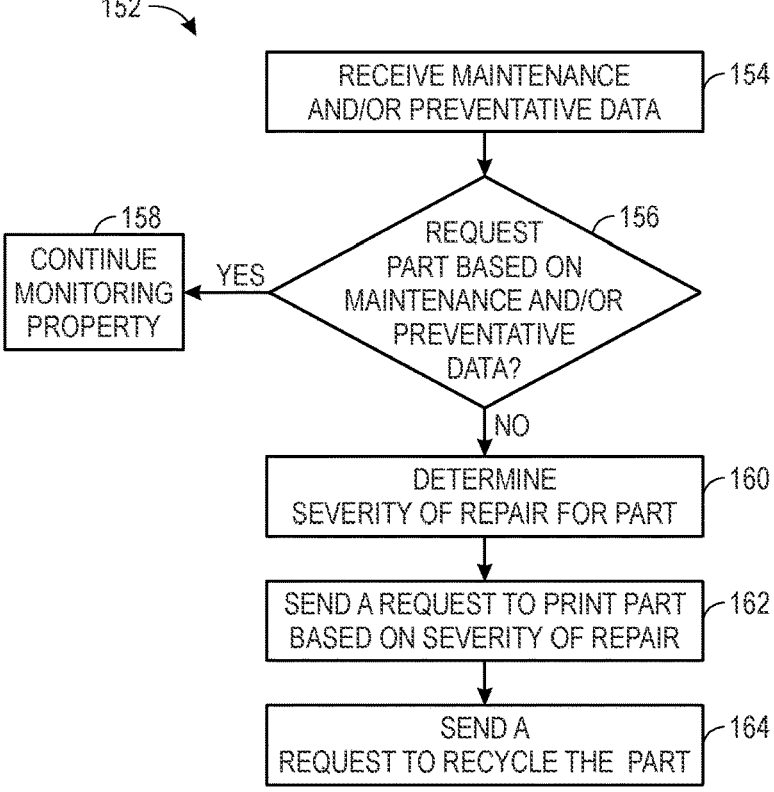
FIG. 5 is a flow diagram of a method for printing parts based on maintenance or preventive data associated with the parts, in accordance with embodiments described herein.

FIG. 4 is a flow diagram of an embodiment of a method 120 for printing 3D parts based on a prediction of needed parts using the 3D parts system 10 of FIG. 1. While the method 120 of FIG. 4 and method 150 of FIG. 5 are described using acts in a specific sequence, it should be understood that the described acts may be performed in different sequences than the sequence illustrated, and certain described acts may be skipped or not performed altogether. In general, at least some of the steps of the method 100 and method 150 may be implemented at least in part by the 3D parts system 10 of FIG. 1. Specifically, these steps may be implemented at least in part by the controller 12 and/or the processor 34 of the controller 12 that executes instructions stored in a tangible, non-transitory, computer-readable medium, such as the memory 32. In alternative or additional embodiments, at least some steps of the method 100 and method 150 may be implemented by any other suitable components or control logic, and the like.

The processor may monitor and receive (block 122) data from the resources, the sensors, and/or relevant portable devices, such as user devices. In some embodiments, the processor may also receive and use data from the maintenance schedule, as will be discussed in detail with respect to FIG. 5. As described herein, the data may be used to predict needs for parts that can be preemptively addressed by 3D printing. In particular, the processor may monitor one or more insured properties located in one or more areas. By way of example, the processor may monitor properties located within a particular area, which includes a space occupied within a threshold distance from a particular location (e.g., range of geographic coordinates). Monitoring the area may enable prediction of the one or more parts needed for the area using the data (e.g., will likely be in demand). The parts may be printed to replace damaged parts, maintain the existing parts, and/or prevent damage to the existing parts. To prevent issues in the monitored area, the processor may predict a need for 3D printing the supplies for the area. As another example, the sensors may provide data indicative of the conditions at or near a property associated with the consumer.

The processor may determine (block 124) risk to property based on the data. The risk may be based on present conditions or expected conditions (e.g., conditions based on historical environmental conditions, sensor data, weather forecasts). Specifically, the processor may determine risk (e.g., low, moderate, severe, a risk score) based on one or more factors indicating conditions of the property and/or the area around the property that may result in needing 3D printed parts. The one or more factors, as previously discussed, may include a maintenance schedule and/or a preventive care schedule associated with the property, sensor data from the sensors disposed at the property, present environmental conditions near or at a particular location or area (e.g., within a threshold distance from the property), expected environmental conditions that may cause the consumer to likely replace the parts, and so forth.

The processor may perform a statistical analysis or a similar analysis for the received data to determine the risk. By way of example, the processor may consider environmental conditions as a factor to determine a risk. The data may indicate weather conditions indicative of a storm or an expected storm, and the processor may determine the risk associated with the weather conditions, for example, in view of historical weather conditions and associated parts damage in the area. The historical weather conditions may be based on previous weather conditions in the area or similar areas.

The processor may determine whether (decision block 126) the risk is below a risk threshold, such that the parts will not need to be replaced. In some embodiments, the risk threshold may be based on a correlation between historical environmental conditions in the area and damage to the parts that cause a need for replacement parts in the area. The risk threshold may also consider particular parts that may become damaged due to the environmental conditions, the material of the particular parts, the criticalness of the particular parts to a system or property, and so forth. If the risk is below the threshold, the processor may continue (block 128) monitoring the property. That is, the processor may continue tracking and/or receiving data from the resources, the sensors, the maintenance schedule, and/or the user devices, as well as processing the data to determine risk (e.g., present risk or upcoming risk) associated with the sensor data.

On the other hand, if the processor determines that the risk is not below the risk threshold (e.g., above the threshold), the processor 34 may predict (block 130) via a predictive algorithm that one or more parts are to be 3D printed for the one or more insured properties at risk. That is, the data may indicate that the present or approaching conditions (e.g., based on weather reports for the upcoming week), will likely cause damage above the risk threshold, triggering a need for the 3D printing. Thus, the processor may predict (block 130) the 3D parts to be printed, for example, before (e.g., in advance of) the presence of the environmental conditions that would likely cause the need for replacement parts in the area. That is, based on the data indicative of the risk associated with the conditions in the area, the processor may determine the parts that will likely need to be replaced. In this manner, the parts may be quickly and efficiently provided to the properties in the area (e.g., via the 3D printers associated with the consumer) to reduce likelihood of damage to the properties. Additionally or alternatively, the risk and conditions may also be based on maintenance of the properties.

After determining the one or more parts to be 3D printed, the processor may automatically send (block 132) a request for the parts to be 3D printed. In some embodiments, the processor may send an additional request to the consumer to approve or disapprove the request for the 3D printing prior to printing the parts. In some embodiments, the processor may send instructions (e.g., to an autonomous vehicle) to deliver the parts to appropriate locations (e.g., a current location of a vehicle driven by a consumer, such as according to GPS coordinate obtained from the vehicle and/or the user device of the consumer associated with or traveling with the vehicle) or properties to facilitate installation, for example. In some embodiments, such as the depicted embodiment, the processor may send (block 134) a request to recycle the printed parts, printed sensors, or both, as discussed with respect to FIG. 1.

FIG. 5 is a flow diagram of a method 150 for printing and using the 3D parts system 10 based on maintenance and/or preventive data associated with parts. In some embodiments, the processor may receive (block 154) maintenance data, preventive data, or both. That is, the 3D parts system may track and/or receive this information via at least the maintenance schedule, a preventive care schedule that may be based on the maintenance schedule, or both. In some embodiments, the maintenance data may include data associated with maintaining the vehicle (e.g., parts and/or property associated with consumer). For example, the maintenance data may indicate a lifespan for a particular part, the materials used for printing the part, a routine check-up and parts replacement (e.g., monthly, every 50,000 miles, every year, and so forth) for maintaining the vehicle to operate above an operations threshold. The threshold may correspond to the vehicle functioning as intended or as expected. Preventive data may include data associated with preventing damage that may otherwise cause the vehicle to operate below the operations threshold. In some instances, the maintenance data and the preventive data may be related, such that the same parts may be replaced based on the date.

The processor may determine whether to request (decision block 156) a part based on the maintenance data, preventive data, or both. That is, the processor may determine if the data indicates that the vehicle is due for a new part or replacement part to maintain the vehicle, to prevent damage that may otherwise occur to the vehicle, or both. If the processor determines that based on the data, the part should not be requested, the processor may continue (block 158) monitoring the one or more properties. That is, the processor may continue monitoring the maintenance schedule or data, preventive care schedule or data, or both, to proactively maintain the vehicle to operate as expected and to print parts as needed.

If the processor determines that based on the data, the part should be requested, the processor may determine (process block 160) a severity of repair for the part being requested. Often, a part may be more worn than expected at the scheduled maintenance checkpoint (e.g., yearly check), and thus, may need more repairs than expected. By way of example, the part being replaced based on the maintenance data may be damaged and thus, may need to be completely replaced. In some instances, a portion of the part may be replaced. Moreover, parts that are replaced and assessed for severity of repair may also include parts that may be replaced based on data from the sensors, as discussed with respect to FIG. 3 and FIG. 4. That is, the sensors may also detect parts that may need replacement and may specifically indicate portions of the part (e.g., a backside of the part, entire part, and so forth) that needs replacement. The severity of the repair for this part may be assessed as described herein. The consumer may print or supervise automated printing of the part using a printer associated with the consumer when the severity of repair is low, as previously discussed. Directly printing may be a more cost-effective and a more efficient means for replacing the part than submitting a request to the insurance company, waiting for the part to be manufactured or retrieved from a warehouse associated with the insurance company, and shipped for delivery to the consumer. As such, the insurance company may provide rebates or other insurance-related incentives for printing the part when authorized, as previously discussed.

Specifically, and as previously discussed, the consumer may 3D print the replacement part when the severity of the repair is below a repair threshold while a specialist in a DRP process may 3D print the part when the severity is above the repair threshold. In some instances, the repair threshold may include different levels, such as a first repair threshold (e.g., low repair), a second repair threshold (e.g., intermediate repair), a third repair threshold (e.g., high repair), and so forth, each having a different authorized means or personnel for printing.

The processor may send (block 162) a request to print the part based on the determined severity of repair. For example, based on the level of repair, the printing may be authorized for the consumer, a specialist in the area, or a manufacturing specialist authorized by the insurance company. After the part is printed by the authorized person, the processor may send (block 164) a request to recycle the printed sensors, as discussed with respect to FIG. 1. As such, the 3D print system described herein facilitates 3D printing of parts to maintain care of insured property, prevent future damage to the insured property, or both. Moreover, the 3D print system includes printing sensors to facilitate customizing placement of the sensors with respect to the property, enabling efficient and accurate monitoring due to the particular placement. Printing the parts may generally enable efficient replacement and delivery of parts for the consumer so that the property may continue to operate as expected. The consumer printing maintenance, preventive, and replacement parts may also reduce time and costs otherwise associated with having the property checked routinely for maintenance, as well as reduce time and costs associated with manufacturing the replacement parts at a distribution site and subsequently delivering them to the consumer.

While only certain features of the invention have been illustrated and described herein, many modifications and changes will occur to those skilled in the art. It is, therefore, to be understood that the appended claims are intended to cover all such modifications and changes as fall within the true spirit of the invention. It should be appreciated that features of FIGS. 1-5 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f). maintenance

The invention claimed is:

1. A three-dimensional parts system, comprising:
a sensor configured to provide data indicative of conditions at or near a property associated with a consumer; and
a three-dimensional printer configured to print a part of the property; and
one or more processors configured to:
monitor the data from the sensor;
access a maintenance schedule for the property;
access resources that indicate expected environmental conditions at the property;

determine an automatic request to print the part based on the data from the sensor, a recommended replacement time indicated by the maintenance schedule, and the expected environmental conditions at the property; and
in response to the automatic request, instruct the three-dimensional printer to print the part.

2. The three-dimensional parts system of claim 1, wherein the three-dimensional printer is located at or near the property associated with the consumer.

3. The three-dimensional parts system of claim 1, wherein the data from the sensor indicates current environmental conditions at the property.

4. The three-dimensional parts system of claim 1, wherein the one or more processors are configured to, in response to the automatic request and prior to occurrence of the expected environmental conditions at the property, instruct the three-dimensional printer to print the part.

5. The three-dimensional parts system of claim 4, wherein the one or more processors are configured to, in response to completion of printing of the part and prior to occurrence of the expected environmental conditions at the property, instruct an autonomous vehicle to deliver the part to the property.

6. The three-dimensional parts system of claim 1, wherein the three-dimensional printer has an authorization level that corresponds to a severity level of repair associated with the part, and the authorization level blocks personnel without the authorization level from operating the three-dimensional printer to print the part.

7. The three-dimensional parts system of claim 1, wherein the one or more processors are configured to send a request to recycle a previous part for printing material, wherein the printing material is used to print the part.

8. The three-dimensional parts system of claim 1, wherein the sensor is a printed sensor having a custom dimension to enable particularly disposing the printed sensor at a target location at the property.

9. The three-dimensional parts system of claim 1, wherein the one or more processors are configured to instruct the three-dimensional printer to print the part comprising printed circuitry.

10. The three-dimensional parts system of claim 9, wherein the printed circuitry is configured to be powered via battery, solar energy, wirelessly, or any combination thereof.

11. The three-dimensional parts system of claim 10, wherein the one or more processors are configured to instruct the three-dimensional printer to print the part comprising the printed circuitry and the battery.

12. The three-dimensional parts system of claim 1, wherein the property comprises a vehicle.

13. A three-dimensional parts system, comprising:
a sensor configured to provide data indicative of current environmental conditions at a property associated with a consumer; and
one or more processors configured to:
monitor the data from the sensor;
access resources that indicate expected environmental conditions at the property;
access a maintenance schedule for the property;
determine an automatic request to print a part based on a recommended replacement time indicated by the maintenance schedule and at least one of the current environmental conditions at the property or the expected environmental conditions at the property; and

in response to the automatic request, instruct a three-dimensional printer to print the part.

14. The three-dimensional parts system of claim 13, comprising the three-dimensional printer configured to print the part for the property.

15. The three-dimensional parts system of claim 14, comprising an autonomous vehicle that is configured to carry the three-dimensional printer to deliver the part to the property.

16. The three-dimensional parts system of claim 13, wherein the one or more processors are configured to:

implement machine learning to predict that the part will be needed at the property at a future time based on the current environmental conditions at the property, the expected environmental conditions at the property, or both; and instruct the three-dimensional printer to print the part in advance of the future time.

17. The three-dimensional parts system of claim 13, comprising one or more additional sensors configured to provide additional data indicative of an operational condition of an existing part at the property, wherein the one or more processors are configured to:

monitor the additional data from the one or more additional sensors; and determine the automatic request to print the part for replacement of the existing part based the operational condition of the existing part and at least one of the current environmental conditions at the property or the expected environmental conditions at the property.

18

18. A three-dimensional parts system, comprising:

a sensor configured to provide data indicative of conditions at or near a property associated with a consumer;

a three-dimensional printer configured to print a part of the property, wherein the three-dimensional printer has an authorization level that corresponds to a severity level of repair associated with the part, and the authorization level blocks personnel without the authorization level from operating the three-dimensional printer to print the part; and one or more processors configured to:

monitor the data from the sensor;

access a maintenance schedule for the property;

determine an automatic request to print the part based on the data from the sensor, a recommended replacement time indicated by the maintenance schedule, or both; and in response to the automatic request, instruct the three-dimensional printer to print the part.

19. The three-dimensional parts system of claim 18, wherein the data from the sensor indicates current environmental conditions at the property, and the one or more processors are configured to determine the automatic request to print the part based on the current environmental conditions at the property, the recommended replacement time indicated by the maintenance schedule, or both.

20. The three-dimensional parts system of claim 18, wherein the one or more processors are configured to determine the automatic request to print the part based on the data from the sensor and the recommended replacement time indicated by the maintenance schedule.

* * * * *